United States Patent [19]

Juziuk et al.

[11] 4,232,217

[45] Nov. 4, 1980

[54] STEPPER MOTOR DRIVE FOR A MECHANICAL CAMSHAFT

[75] Inventors: Jurgen A. Juziuk, Livonia; Ronald H. Mack, Plymouth; Eugene F. Banka, Livonia, all of Mich.; Edward A. Nicol, San Diego, Calif.

[73] Assignee: Burroughs Corporation, Detroit, Mich.

[21] Appl. No.: 33,890

[22] Filed: Apr. 27, 1979

[51] Int. Cl.³ .................... G06K 13/00; G06K 13/02; G06K 13/16; G06K 13/20

[52] U.S. Cl. .................................. 235/480; 101/233; 235/481; 400/105

[58] Field of Search ............... 235/475, 477, 479, 480, 235/481, 432; 400/24, 56, 58, 105; 101/233; 360/1

[56] References Cited

U.S. PATENT DOCUMENTS

| | | | |
|---|---|---|---|
| 3,803,388 | 4/1974 | Williamson et al. | 235/475 |
| 3,951,251 | 4/1976 | Zaccagnino, Jr. | 235/481 |

*Primary Examiner*—Daryl W. Cook
*Attorney, Agent, or Firm*—Kenneth J. Cooper; Charles E. Quarton; Kevin R. Peterson

[57] ABSTRACT

A drive system for processing passbook data includes a bi-directional stepper motor responsive to programmed input signals, cam sets rotated by the stepper motor for initiating data sensing, document positioning, and data transfer operations, and cam followers actuated by the contour of their associated rotating cam sets for moving their reacting components to perform those operations. Appropriate cam followers cause a pressure plate and sensor to move toward and sense coded data on a document, a gate to open and close to position the document for further processing, and a print platen to advance toward the document, provide a backing during data transfer, and then retract.

6 Claims, 5 Drawing Figures

HOME POSITIONS

RIGHT
SIDE
VIEW

STEPPER MOTOR DRIVE FOR A MECHANICAL CAMSHAFT

BACKGROUND OF THE INVENTION

1. Field of the Invention

This invention relates to a drive system for processing passbook data.

2. Description of the Prior Art

Systems for processing passbook data have embodied varied applications of motors, clutches actuated by solenoids, and other components to sense data on the document, position the document for further processing, and allow data to be transferred to the document. Some prior systems have used a motor to accomplish each document processing operation while other approaches relied on one motor in conjunction with a network of clutches and solenoids to actuate the processing mechanisms. These prior devices for processing passbook data possessed several disadvantages. They consumed more energy and required additional parts, assembly, service, and labor for their production. In addition, there existed an increased likelihood of malfunctions in the complex structures resulting in more cost to the system owner and inconvenience to the customer of the aborted service.

The applicant's invention offers a simplified, less costly device for processing passbook data. One bi-directional motor incrementally drives a system of cams and thereby actuates associated cam followers to perform the desired operations on a passbook.

SUMMARY OF THE INVENTION

The applicant's invention eliminates the need for motor duplications or a complex system of clutches and solenoids driven by a constantly running motor. One bi-directional stepper motor, controlled by programmed input signals, drives a simplified network of cams, cam followers, and their associated components. A first cam-cam follower combination reacts to the motor drive, moves a pressure plate and a sensor of coded data to and from a document to read appropriate information; a second cam-cam follower combination opens and closes a document positioning gate; and a third cam-cam follower combination advances a print platen toward the document, provides a backing during data transfer to the document, then retracts the platen.

Due to the bi-directional quality of the stepper motor employed, various passbook processing operations may be repeated.

DETAILED DESCRIPTION

Figure 1:
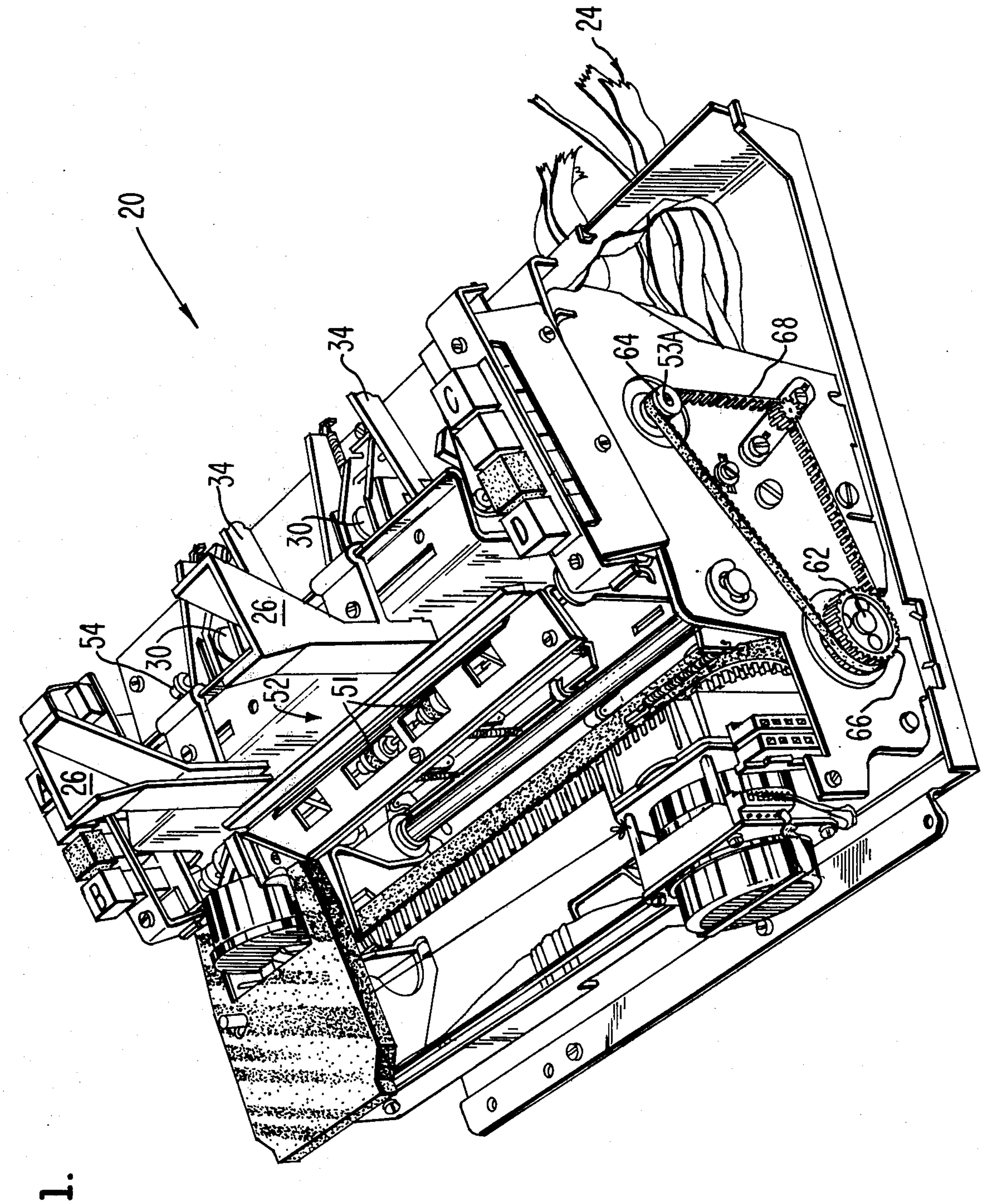
FIG. 1 is a perspective view of the housing for the passbook processing drive system.

In FIG. 1, housing 20 encloses the drive system 22 (FIG. 2) for processing passbook data. The drive system's functions are controlled by programmed input signal and power leads 24 from a source not shown. When a passbook is presented for recording a transaction, a teller activates the drive system by depressing one of the four left and right corner buttons, A, B, and C, D, respectively, which corresponds to his working account with his employer. The programmed input signals reset the drive system for passbook data processing.

HOME POSITION NO. 1

Figure 2:
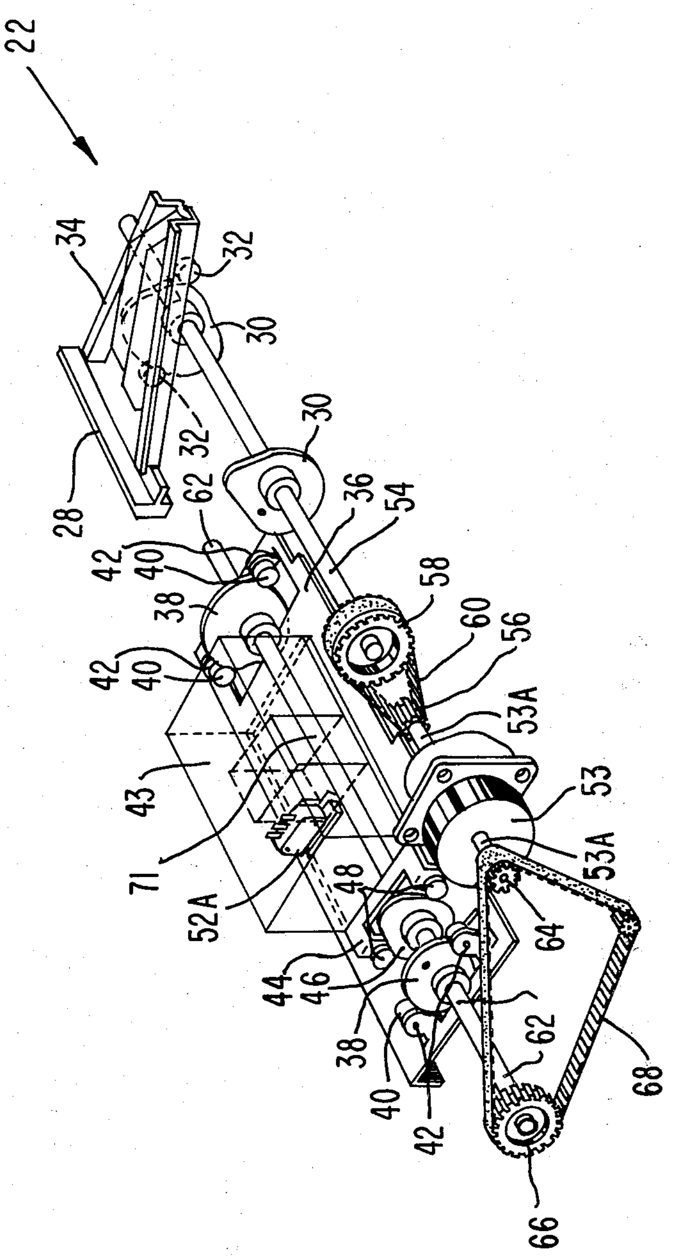
FIG. 2 is a perspective view of the passbook processing drive system.
Figure 3A:
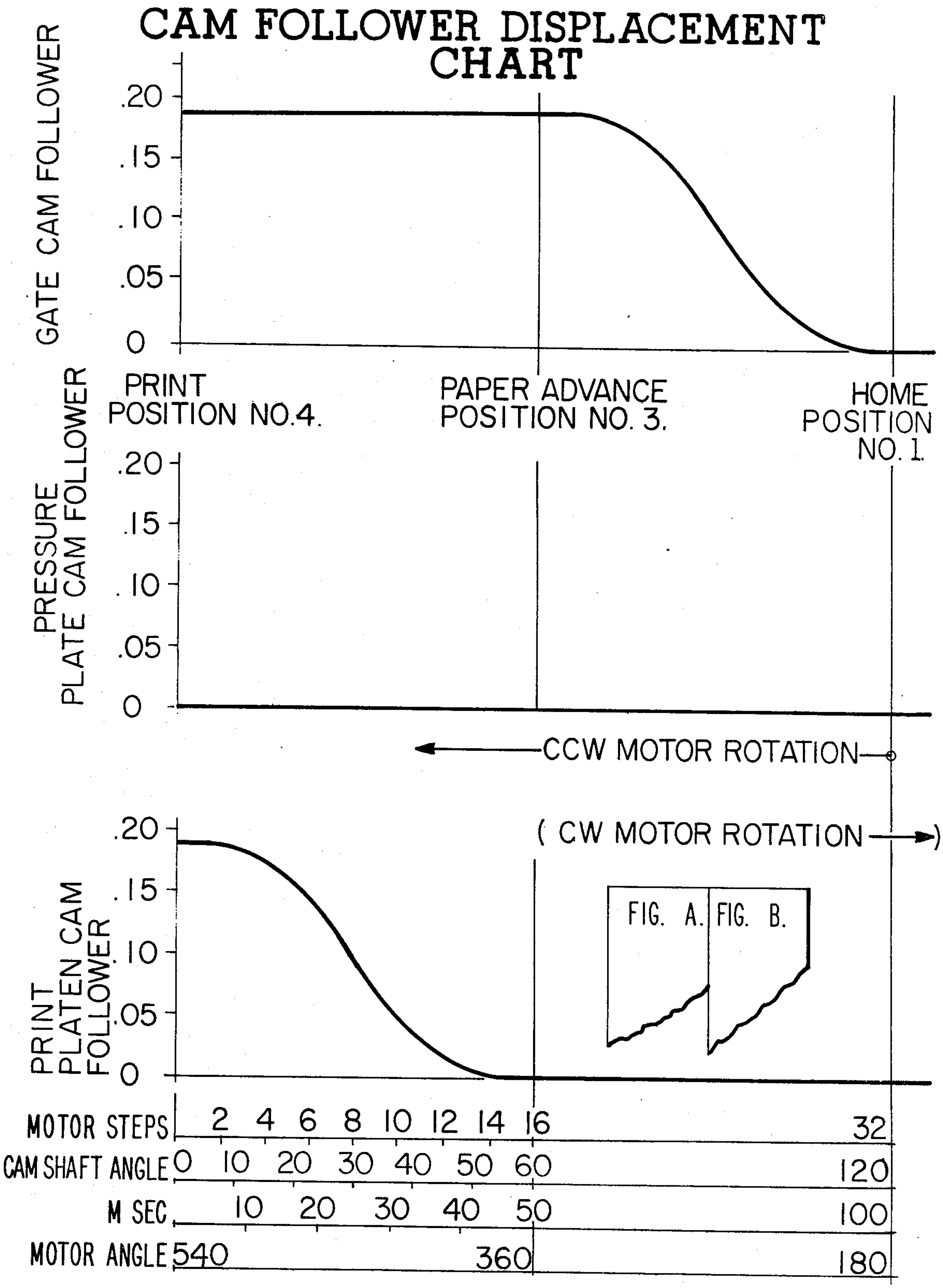
FIGS. 3A and 3B form a composite to illustrate displacement of the passbook drive system cam followers, drive motor steps and shaft angle, cam shaft angle, and their corresponding time reference.
Figure 3B:
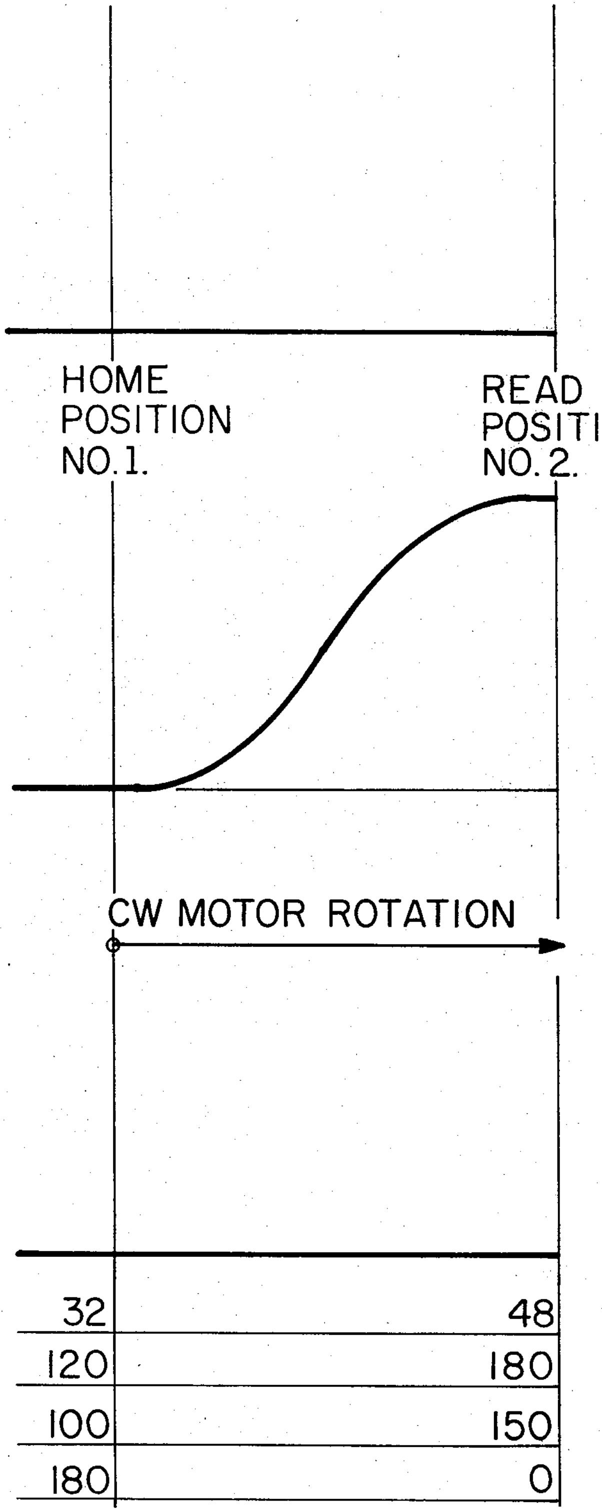

Referring to FIGS. 2, 3A, and 3B, the reset or Home Position No. 1 is defined by the following placement of the drive system 22 components: to allow passbook insertion in guides 26 (FIG. 1) to a proper depth for data processing, print platen 28 is retracted by print platen cam 30 interacting with platen cam followers 32 mounted on platen frame 34; to allow accurate alignment of the passbook for sensing data in and transfering data to the passbook, reference gate 36 is closed by gate cams 38 interacting with gate cam followers 40 mounted on gate tabs 42; and to allow passage of the passbook for data sensing and transfering, a pressure plate 43, mounted on plate bracket 44, is opened by pressure plate cam 46 interacting with plate cam followers 48 on plate bracket 44. The system is now ready to receive a passbook and process the required transaction.

READ POSITION NO. 2

A passbook is opened and vertically inserted in passbook guides 26 (FIG. 1) by the teller. When fully inserted, the passbook is in contact with passbook advance rollers 51. From this point to the conclusion of the data processing of the inserted passbook, all operations are accomplished automatically by the programmed input signals.

Figure 4:
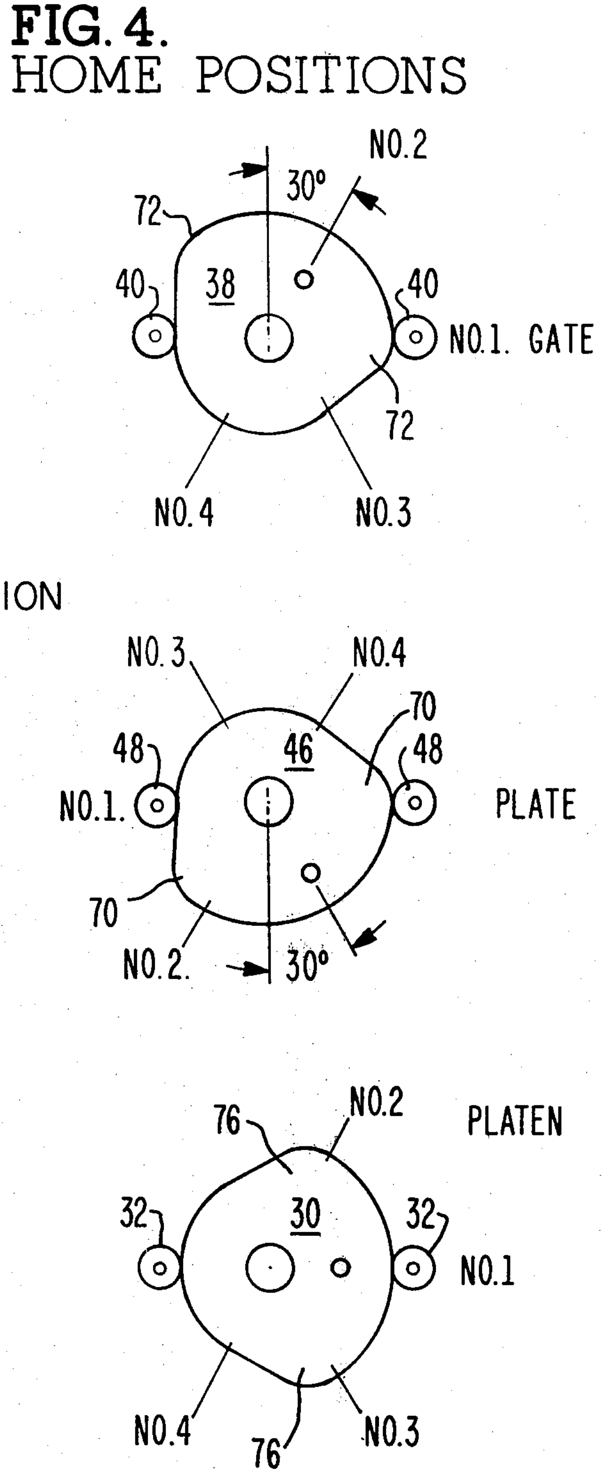
FIG. 4 illustrates the passbook drive system's cam-cam follower orientations for the Home Position No. 1.

A sensor (not shown), horizontally adjacent to passbook advance rollers 51, now activates a motor (not shown) to rotate the rollers and draw the passbook into channel 52. Skew switch 52A (FIG. 2) detects when the passbook has reached the proper depth and deactivates the passbook advance roller motor. Referring to FIGS. 2, 3A, 3B, and 4, the input signals corresponding to data processing sequences are fed to a bi-directional stepper motor 53 which incrementally drives the system 22. From the Home Position No. 1, bi-directional stepper motor 53 is energized to rotate a motor drive shaft 53A clockwise 180 degrees and advance drive system 22 to Read Position No. 2. The rotation of motor drive shaft 53A is transferred to platen drive shaft 54 by platen drive gear 56 turning platen pulley 58 with platen drive belt 60. The rotating platen drive shaft 54 turns print platen cams 30 to Position No. 2, but as shown in FIG. 4, the uniform curvature of print platen cams 30 between Position No. 1 and No. 2 will not result in platen cam follower 32 displacement (FIG. 3B).

The same motor drive shaft rotation is transfered to gate-plate drive shaft 62 by gate-plate drive gear 64 turning gate-plate drive pulley 66 with gate-plate drive belt 68. The rotating gate-plate drive shaft 62 turns gate cams 38 to Position No. 2 (FIG. 4), but similar to the rotation of platen cams 30, the uniform curvature of gate cams 38 will cause no displacement of gate cam followers 40 (FIG. 3B). Therefore, reference gate 36 remains closed as in Home Position No. 1.

The clockwise motor drive shaft rotation of 180 degrees closes pressure plate 43, mounted on pressure plate bracket 44, to the inserted passbook when the rotating gate-plate drive shaft 62 turns pressure plate cam 46 to Position No. 2. FIG. 4 shows that as plate lobes 70 of pressure plate cam 46 move clockwise, plate cam followers 48 will be displaced from the Home Position No. 1 (FIG. 3B). This displacement moves pressure plate 43 toward the passbook and an appropriate programmed input signal activates a read-write sensor 71 (FIG. 2) of coded data, located on pressure plate 43, to read the exposed passbook's account number, existing balance, and position of the next line on which data is to be printed.

PAPER ADVANCE POSITION NO. 3

When the passbook data has been read, a programmed input signal will energize stepper motor 53 to turn motor drive shaft 53A counterclockwise 360 degrees to Paper Advance Position No. 3. So the passbook can be advanced for a subsequent operation, the following reactions to the motor drive shaft rotation occur: print platen cams 30 (FIG. 4), turned by platen drive shaft 54 from No. 2 to No. 3, continue to contact platen cam followers 32 with a uniform curvature, cause no platen cam follower displacement (FIG. 3A), and retain print platen 28 in the retracted position; gate-plate drive shaft 62 turns gate cams 38 (FIG. 4) from No. 2 to No. 3, causes gate lobes 72 to displace gate cam followers 40 (FIG. 3A), and retracts reference gate 36 to open a passage for advancing the passbook; and gate-plate drive shaft 62 turns pressure plate cam 46 (FIG. 4) from No. 2 to No. 3, moves plate lobes 70 past plate cam followers 48 to return plate cam follower displacement (FIG. 3A) to zero, and retracts the pressure plate 43. A programmed input signal then uses the next line data from the read-write sensor 71 to appropriately pulse the passbook advance roller motor (not shown), rotate the rollers 51 (FIG. 1), and position the passbook for Print Position No. 4.

PRINT POSITION NUMBER FOUR

After the passbook has advanced to Print Position No. 4, stepper motor 53 is stepped to rotate motor drive shaft 53A counterclockwise 180 degrees. The responses of the print platen, reference gate, and pressure plate are the following: print platen cams 30 (FIG. 4), turned by platen drive shaft 54 from No. 3 to No. 4, cause platen lobes 76 to displace platen cam followers 32 (FIG. 3A) and advance print platen 28 on platen frame 34 to the passbook; gate cams 38 (FIG. 4), turned by gate-plate drive shaft 62 from No. 3 to No. 4, cause no changes in reference gate 36 or gate cam followers 40 (FIG. 3A) displacement due to the failure of gate lobes 72 (FIG. 4) to interact with gate cam followers 40; and pressure plate cam 46, rotated by gate-plate drive shaft 62 from No. 3 to No. 4, likewise provokes no change in pressure plate 43 or plate cam followers 48 displacement (FIG. 3A) when plate lobes 70 fail to contact plate cam followers 48. With print platen 28 placed against the passbook as a backing, an input signal from a remote teller keyboard (not shown) causes the readwrite sensor 71 (FIG. 2) to transfer the transaction entered by the teller onto the passbook.

Once data printing is completed, input signals will be fed to stepper motor 53 for rotating motor drive shaft 53A to Paper Advance Position No. 3. From this position, if new data is to be transfered to the passbook, input signals will advance the passbook and index the drive system 22 (FIG. 2) to Print Position No. 4 (FIG. 3A). If further data transfer is not required, input signals will cause passbook advance rollers 51 (FIG. 1) to space the passbook out of the drive system 22 (FIG. 2) and reset the stepper motor 53 to Home Position No. 1. The drive system is now reset to receive another passbook for data processing.

What is claimed is:

1. A drive system for processing passbook data comprising:

- an incremental drive for actuating the system;
- means for controlling the incremental drive;
- a first rotatable cam set;
- means for sensing data on a document;
- first means for following the configuration of the first rotatable cam set to position the sensing means;
- a second rotatable cam set;
- means for positioning the documents;
- second means for following the configuration of the second rotatable cam set to actuate the document positioning means;
- a third rotatable cam set;
- means for backing the document during data transfer to the document; and
- third means for following the configuration of the third rotatable cam set to properly place the means for backing the document during data transfer to the document.

2. The invention claimed in claim 1, wherein the incremental drive comprises a bi-directional stepper motor.

3. The invention claimed in claim 1, wherein the means for controlling the incremental drive comprises programmed input signals.

4. The invention claimed in claim 1, wherein the means for sensing data on the document comprises a pressure plate and a sensor of coded data.

5. The invention claimed in claim 1, wherein the means for positioning the document comprises a gate movable between an opened and closed position by the second cam following means.

6. The invention claimed in claim 1, wherein the means for backing the document during data transfer to the document comprises a print platen, movable between a forward and retracted position by the third cam following means, against which the document may be placed during data transfer.

* * * * *